F. H. EIJDMAN.
EVAPORATING APPARATUS.
APPLICATION FILED MAY 24, 1909.

984,754.

Patented Feb. 21, 1911.
6 SHEETS—SHEET 2.

F. H. EIJDMAN.
EVAPORATING APPARATUS.
APPLICATION FILED MAY 24, 1909.

984,754.

Patented Feb. 21, 1911.
6 SHEETS—SHEET 3.

F. H. EIJDMAN.
EVAPORATING APPARATUS.
APPLICATION FILED MAY 24, 1909.

984,754.

Patented Feb. 21, 1911.
6 SHEETS—SHEET 5.

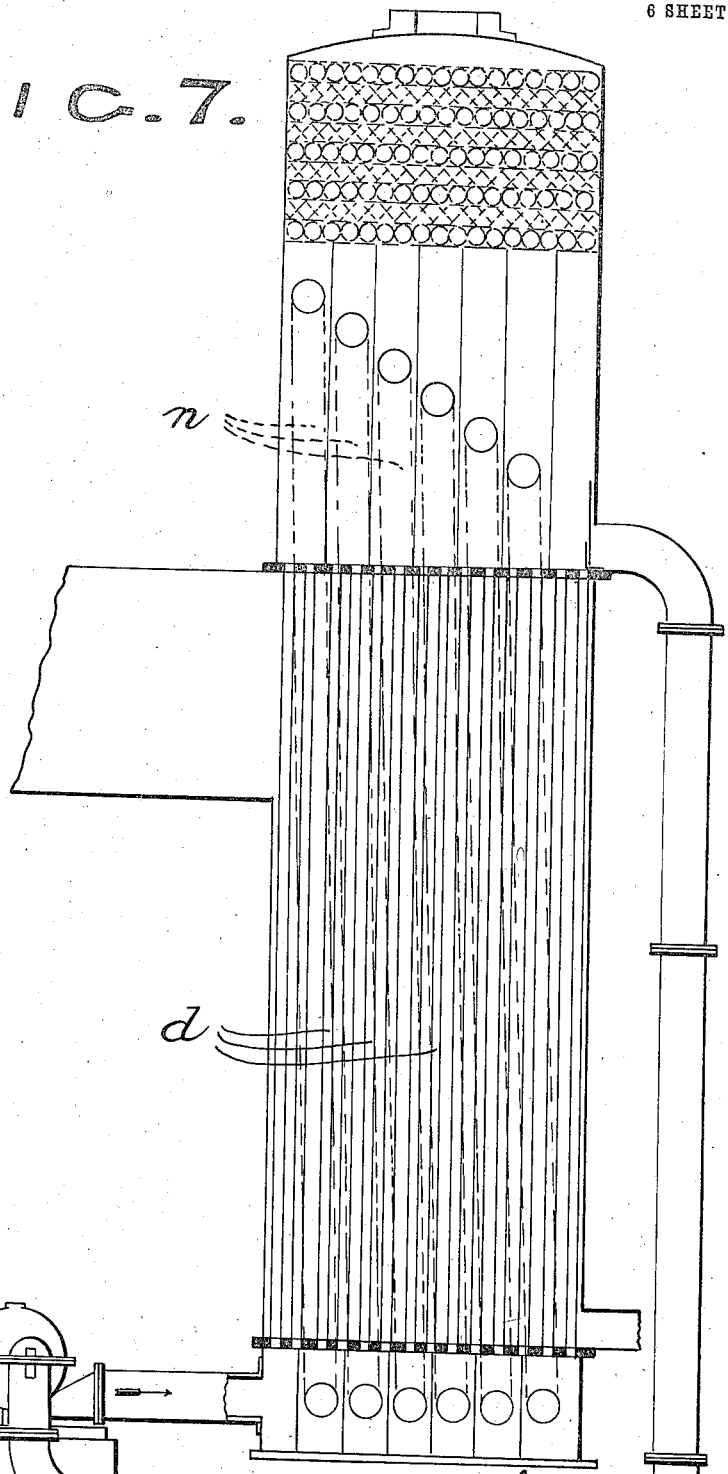

UNITED STATES PATENT OFFICE.

FRANCISCUS HENDRIKUS EIJDMAN, OF RYSWYK, NETHERLANDS.

EVAPORATING APPARATUS.

984,754.   Specification of Letters Patent.   Patented Feb. 21, 1911.

Application filed May 24, 1909. Serial No. 498,049.

*To all whom it may concern:*

Be it known that I, FRANCISCUS HENDRIKUS EIJDMAN, a subject of the Queen of the Netherlands, residing at Ryswyk, Netherlands, have invented certain new and useful Improvements in or Relating to Evaporating Apparatus, of which the following is a specification.

This invention comprises improvements in or relating to apparatus for the evaporation of liquids particularly applicable for use in connection with the evaporation of seawater or its brine, its object being to reduce the clogging of the heating surfaces which has existed in apparatus hitherto proposed and to carry out the process of evaporation in a more economical efficient and systematic manner than heretofore.

The class of apparatus to which my invention has relation is that wherein stacks or aggregations of tubes are held at their extremities by tube plates through which they project into chambers, the lower one of which is shallow, and the upper one of sufficient height to enable the vapors to develop and escape. Such chambers are divided by diaphragms arranged in such a manner that the liquid, impelled by the action of a circulating pump, is caused to traverse adjacent sets of tubes in contrary directions.

According to the present invention, the loss of pressure accruing from the passage of the liquid through the tubes is compensated by correspondingly proportioning the height to which the liquid is forced during its travel, while the elevation to which it is lifted in the first chamber is such that it is obliged to circulate by virtue of its potential energy at its initial and thereby constant velocity through the consecutive compartments of the evaporating apparatus in a systematic well-calculated way, whereby non-clogging of the heating surfaces and efficient evaporation is obtained with very small differences of temperature between the members of the entire apparatus.

The invention is also characteristic in that a trap is provided to prevent the salt or other solid particles from being thrown up and mixed with the steam by the high velocity of the vapors.

In order that this invention may be clearly understood and more easily carried into practice reference may be had to the appended explanatory six sheets of drawings, on which,—

Figure 1:
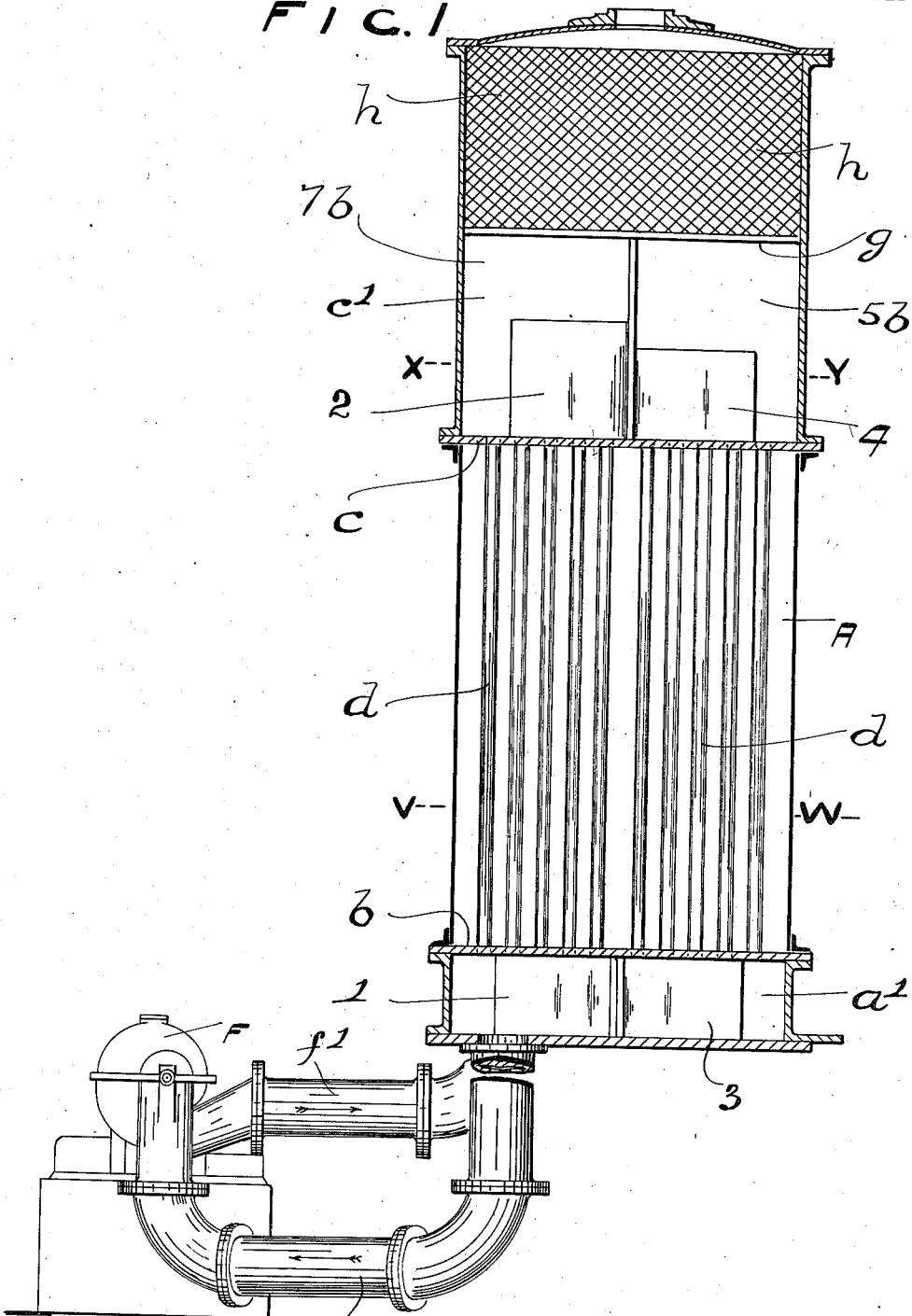
Figure 2:
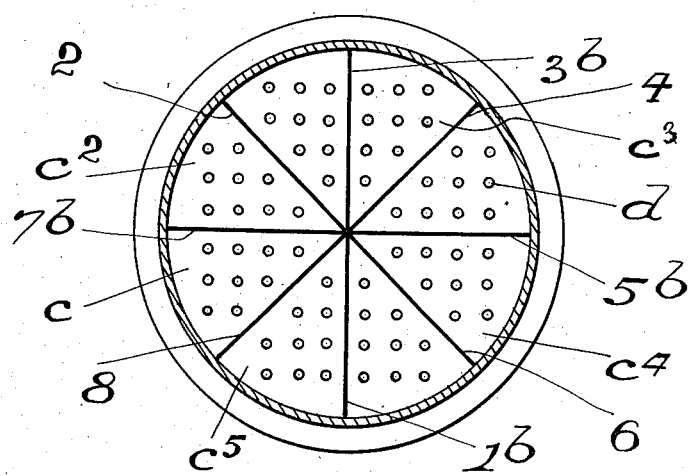
Figure 3:
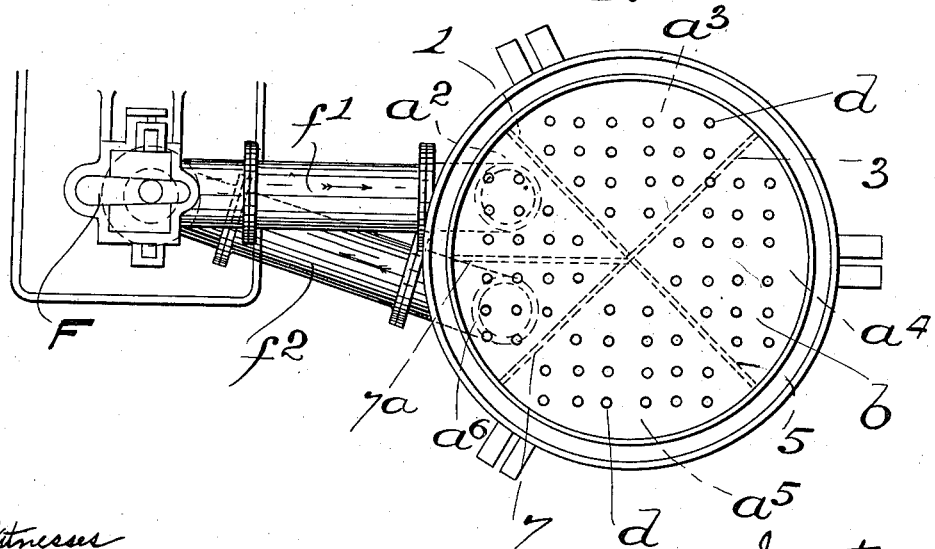
Figure 4:
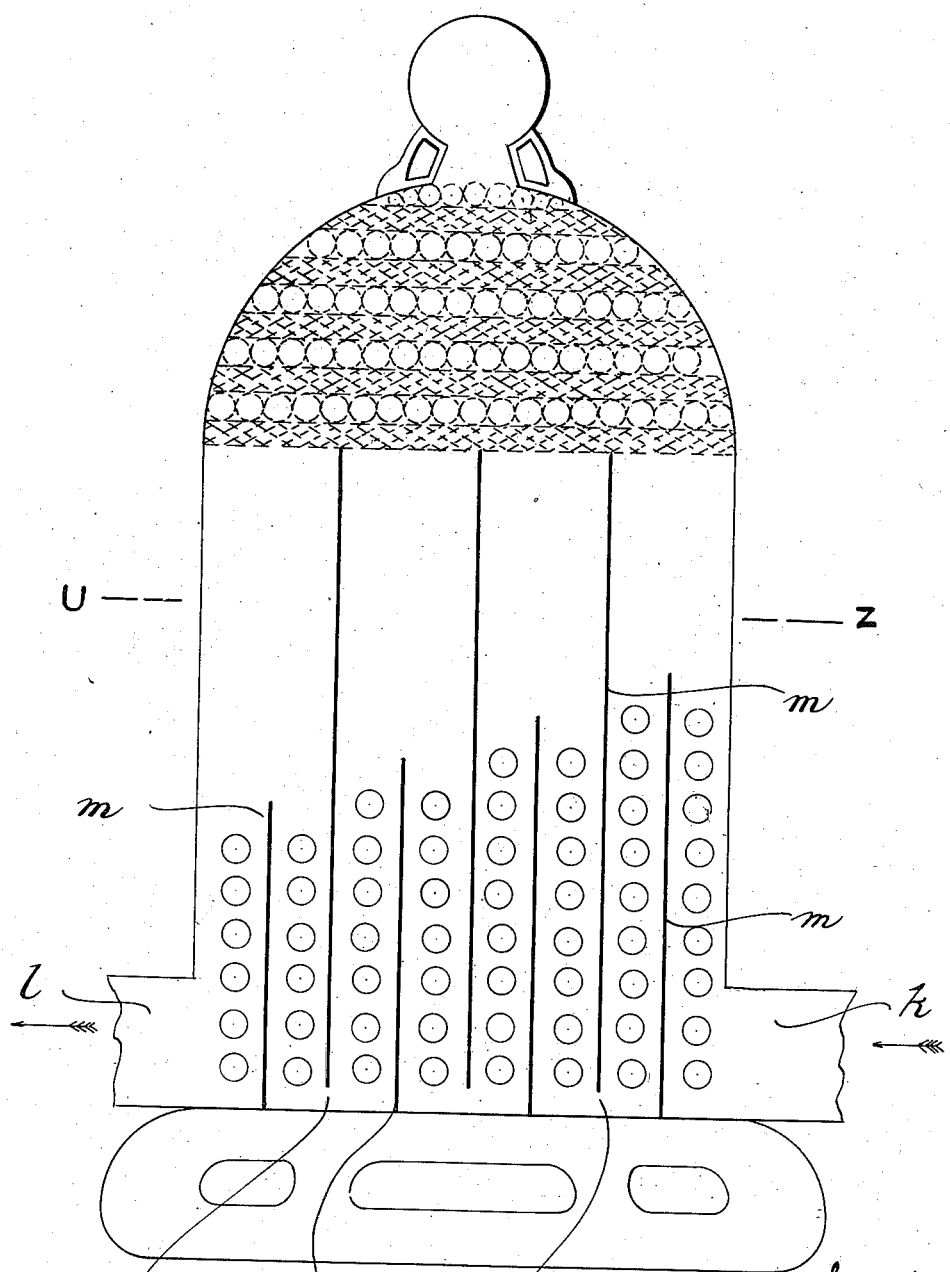
Figure 5:
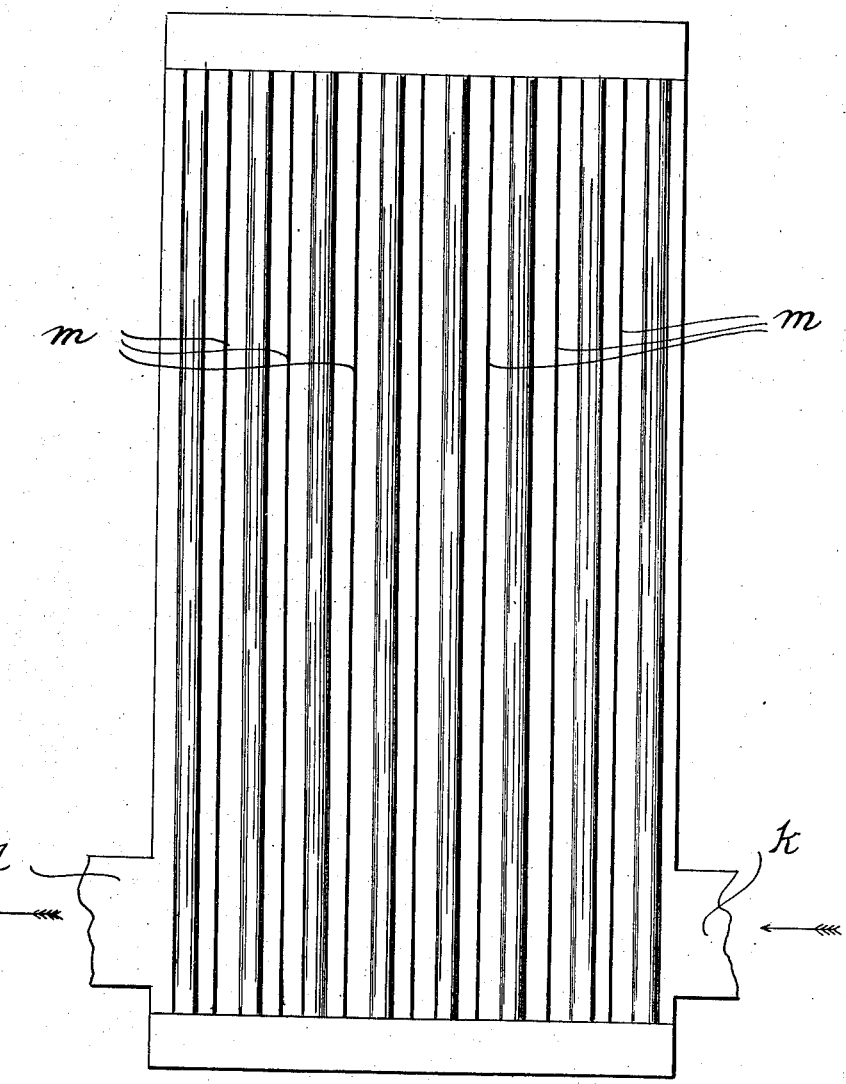
Figure 6:
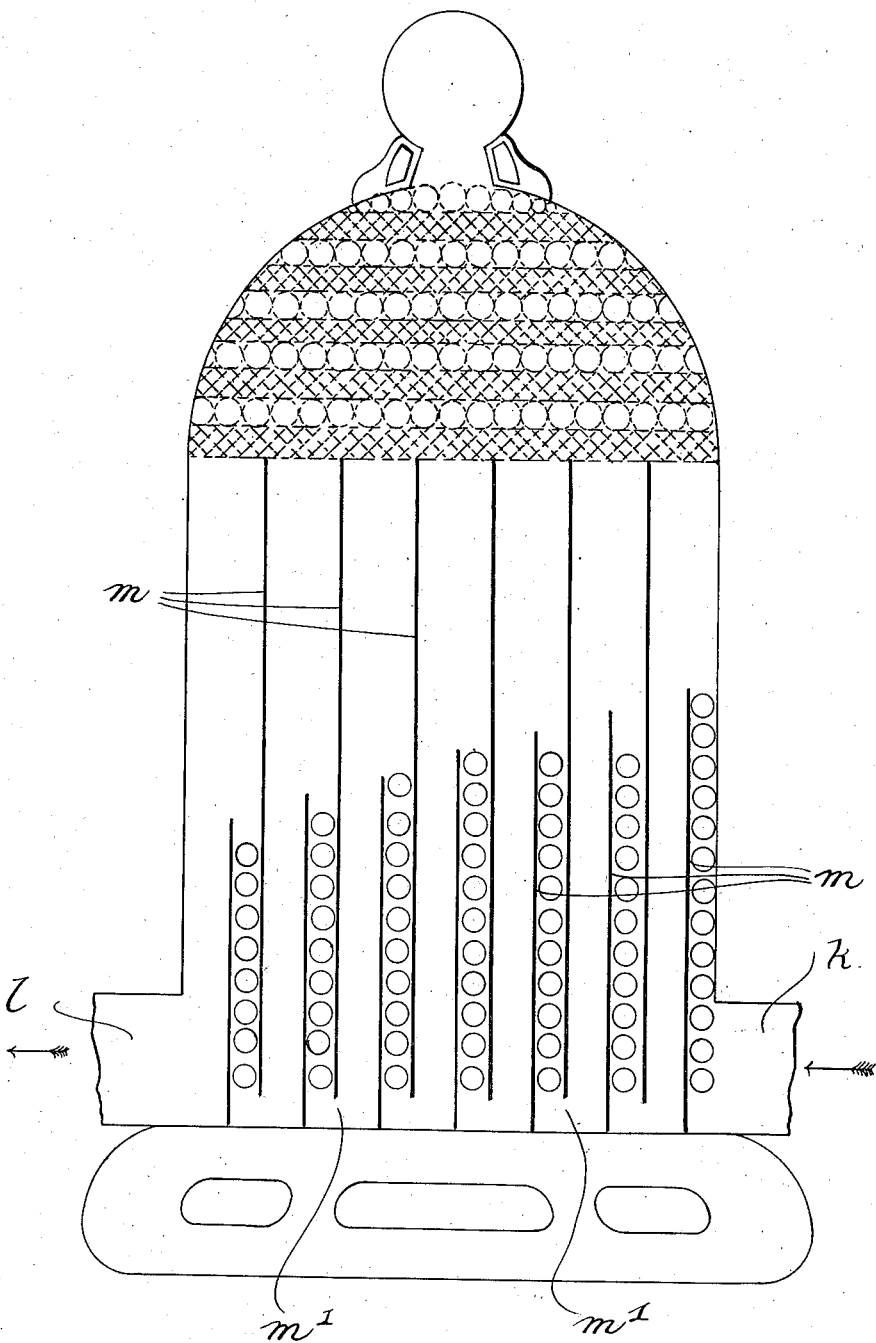

Figure 1 shows in part sectional elevation an application of the present improvements in an evaporating apparatus of the vertical type. Fig. 2 is a section on line X Y of Fig. 1, and illustrates the apparatus shown by Fig. 1. Fig. 3 is another sectional plan, the section plane being V W of Fig. 1. Fig. 4 illustrates in sectional elevation an application of my invention to horizontal apparatus, in which the heating medium is inside and the liquid outside the tubes. Fig. 5 is a section on plane U—Z of Fig. 4. Fig. 6 is a sectional elevation of a modification of the apparatus shown in Fig. 4. Fig. 7 is an elevation illustrating a modification of the vertical apparatus shown in Fig. 1.

In an embodiment of my invention such as illustrated by Figs. 1 2 and 3, an apparatus of the vertical or Robert type is employed and consists of a casing A provided with tube plates $b$, $c$, through which the vertical tubes $d$ are adapted to pass, connection being thereby established between the lower chamber $a'$ and upper chamber $c'$ for the passage of the liquid.

The lower chamber $a'$ is divided by the diaphragm or partitions 1, 3, 5, 7, $7^a$ and the upper one $b'$ by the partitions $1^b$ $3^b$ $5^b$ $7^b$ and by the secondary partitions 2, 4, 6, 8. The partitions 1, 3, 5, 7, $7^a$ completely separate the compartments $a^2$, $a^3$, $a^4$, $a^5$, $a^6$ from each other, and the partitions $1^b$, $3^b$, $5^b$, $7^b$ divide the upper chamber $c'$ into four principal compartments $c^2$, $c^3$, $c^4$, $c^5$, which are subdivided by the secondary partitions 2, 4, 6, 8, in such a manner that the evaporating liquid is compelled to circulate through the consecutive compartments and stacks of tubes. Whereas the lower chamber $a'$ has five compartments the upper one $c'$ has eight owing to the secondary partitions 2, 4, 6, 8, subdividing the principal compartments $c^2$, $c^3$, $c^4$, $c^5$.

The circulation is accelerated as aforesaid, by means of the circulating pump F which aspires the liquid from the compartment $a^6$ and forces it into the compartment $a^2$, suitable pipes $f'$ $f^2$ serving as the connecting media between the pump F and the evaporating apparatus.

The heights to which the liquid is forced during its passage up and down the apparatus are proportional to the drop in pressure ensuing as the result of such travel so that a constant velocity of the liquid is maintained and to effect this object the diaphragms in the upper chamber are made of various heights.

Judging theoretically the secondary diaphragms might seem superfluous, as the liquid will run through the tubes with the velocity the pump communicates to it, and this velocity being once given, the rest will follow as a matter of course. Yet, these secondary diaphragms are of the greatest utility, as they break up the ascending stream in the chambers $c^2$, $c^3$, $c^4$, $c^5$ sufficiently to allow the excess of heat, taken up by the liquid in its upward and downward progress through the tubes to become latent in the form of vapor, thus causing the liquid to evaporate, which evaporation is stimulated by the agitation of the liquid in consequence of its velocity and the rubbing along the tubes. The height of the diaphragms $1^b$, $3^b$, $5^b$, $7^b$, is of little consequence, provided it is sufficient to prevent any liquid going the wrong way, and leaves room for the hereinafter described "drop-traps." By this arrangement, in which the pump does cheaper and much better (because systematic) work than the tension of vapor did in previous systems, it is possible to obtain for all cases the required circulation velocity of the evaporating liquid necessary to entirely prevent the clogging of the heating surfaces and powerful enough to increase at the same time the transmission of heat per unit of heating surface and of difference of temperature at a hitherto unknown rate, so that the latter may be reduced by increasing the number of pans in one battery, going thereby very far into the "multiplex" system of evaporation.

Although the present improvements have been described as applied to vertical apparatus they may also be applied to horizontal apparatus. Figs. 4 and 5 show respectively in elevation and plan a horizontal apparatus wherein the steam is inside and the liquid outside the tubes. The liquid enters at $k$ and is baffled in its course to the outlet $l$ by partitions $m$ which have alternate spaces $m'$. The partitions $m$ decrease in height from the inlet $k$ to the outlet $l$ as shown in Fig. 4 by which means the liquid, taking a zig zag course is enabled to maintain a constant velocity. In the arrangement shown in Fig. 6 the spaces $m'$ are provided and the liquid is thereby caused to flow vertically in reverse directions, during which process it is only in contact with the heating surface when flowing upwardly.

Fig. 7 shows an embodiment of the vertical apparatus wherein the liquid flows vertically in reverse directions in which it is only in contact with the heating surfaces when flowing upwardly. In this embodiment of my invention the upper and lower chambers are divided with compartments which communicate with each other by external tubes or downcomers $n$ in such a manner that the liquid flows up the heated tubes $d$ and down the external tubes $n$. The junctions of the external tubes $n$ with the sections of the upper chamber decrease in height from the section which the liquid enters first to that which it enters last, by which arrangement the liquid is enabled to maintain a constant velocity.

Any existing evaporation apparatus *in vacuo*, vertical or horizontal may be reconstructed on this principle at a relatively small cost.

To prevent the salt or other matters out of the evaporating liquids being thrown up by the high velocity of the vapors, I have constructed a new trap for them, I cover the heads of the diaphragms $1^b$, $3^b$, $5^b$, $7^b$, in the upper chamber with the layer of strong wire netting $g$ with large meshes and fill the space above the netting $g$ with thin wire netting $h$ of fine mesh. I arrange them to be secured by or hook onto the said strong layer and onto each other.

The small vapor bubbles, containing more or less of the dry matters out of the liquid from which they are generated, are caught by the rough coated surface of the labyrinth of wires. The small drops being rubbed off onto them, gather until they are heavy enough to fall back. Consequently the condensed vapor (the distilled water), will be chemically pure.

Having now described my invention I declare that what I claim is:—

1. In an apparatus for evaporating liquids, a casing, tube plates therein forming, a shallow chamber at the bottom, and, a relatively deeper chamber at the top, of the apparatus, tubes passing through the tube plates and establishing connection between the lower and upper chambers, partitions subdividing the lower chamber into separate compartments, partitions subdividing the upper chamber into several principal compartments, and secondary partitions subdividing the principal compartments of the upper chamber.

2. In an apparatus for evaporating liquids, a casing, tube plates therein forming a shallow chamber at the bottom, and, a relatively deeper chamber at the top, of the apparatus, tubes passing through the tube plates and establishing connection between the lower and upper chambers, partitions subdividing the lower chamber into separate compartments, partitions subdividing the upper chamber into several principal compartments, secondary partitions subdividing the principal compartments of the upper chamber, and means forcing the liquid through the evaporator.

In witness whereof I have hereunto set my hand in the presence of two witnesses.

FRANCISCUS HENDRIKUS EIJDMAN.

Witnesses:
    LEWIS W. GOOLD,
    R. L. GOOLD.